(12) United States Patent
Booth

(10) Patent No.: US 8,470,139 B2
(45) Date of Patent: Jun. 25, 2013

(54) SYSTEMS AND METHOD FOR LOW TEMPERATURE RECOVERY OF FRACTIONATED WATER

(75) Inventor: Donald W. Booth, Charleston, WV (US)

(73) Assignee: NGInnovations, Inc., Crosslanes, WV (US)

( * ) Notice: Subject to any disclaimer, the term of this patent is extended or adjusted under 35 U.S.C. 154(b) by 314 days.

(21) Appl. No.: 12/878,155

(22) Filed: Sep. 9, 2010

(65) Prior Publication Data

US 2011/0139603 A1 Jun. 16, 2011

Related U.S. Application Data

(60) Provisional application No. 61/285,669, filed on Dec. 11, 2009.

(51) Int. Cl.
*B01D 1/00* (2006.01)
*B01D 3/10* (2006.01)

(52) U.S. Cl.
USPC .............. 203/11; 203/47; 203/48; 159/47.3; 159/22

(58) Field of Classification Search
USPC .............. 202/176; 203/11, 47, 48; 159/47.3, 159/22
See application file for complete search history.

(56) References Cited

U.S. PATENT DOCUMENTS

| | | | |
|---|---|---|---|
| 4,026,791 A | 5/1977 | Wallace | |
| 4,211,613 A * | 7/1980 | Meckler | 203/11 |
| 4,324,292 A | 4/1982 | Jacobs et al. | |
| 4,495,056 A | 1/1985 | Venardos et al. | |
| 4,560,812 A | 12/1985 | Blytas | |
| 4,752,399 A | 6/1988 | Viator et al. | |
| 4,765,910 A | 8/1988 | Wolf | |
| 4,895,665 A | 1/1990 | Colelli et al. | |
| 4,950,311 A | 8/1990 | White, Jr. | |
| 4,994,169 A | 2/1991 | Godino et al. | |
| 5,076,895 A * | 12/1991 | Greenfield et al. | 203/10 |
| 5,132,025 A | 7/1992 | Hays | |
| 5,156,706 A | 10/1992 | Sephton | |
| 5,422,012 A | 6/1995 | Adams | |
| 5,895,565 A | 4/1999 | Steininger et al. | |
| 5,986,133 A | 11/1999 | Holtzapple et al. | |
| 6,340,373 B1 | 1/2002 | Billington | |

(Continued)

*Primary Examiner* — Nina Bhat
(74) *Attorney, Agent, or Firm* — Dinsmore & Shohl, LLP; Monika J. Hussell; Olen L. York, III

(57) ABSTRACT

In accordance with one embodiment, a method for treating fractionated water produced by a hydraulic fracturing process is provided. The method includes decanting a fractionated water stream in at least one decanter. The decanter is maintained at a temperature ranging from about 90° F. to about 120° F. The method also includes flashing the decanted water in at least one first flash tank and at least one second flash tank in fluid communication with one another to provide a residual concentrate stream. The first flash tank is operated at a temperature ranging from about 180° F. to about 200° F. and the second flash tank is operated at a temperature ranging from about 140° F. to about 160° F. Both the first flash tank and the second flash tank are maintained at a vacuum pressure. The method also includes evaporating the residual concentrate stream in at least one evaporator kettle to produce a concentrated brine. The evaporator kettle is fluidly connected to the second flash tank, and the evaporator kettle is operated at a temperature ranging from about 95° F. to about 115° F. The evaporator kettle is maintained at a vacuum pressure. The method also includes dewatering the concentrated brine to produce recovered salt having less than about 20 wt. % water.

15 Claims, 1 Drawing Sheet

U.S. PATENT DOCUMENTS

| | | |
|---|---|---|
| 6,508,916 B1 | 1/2003 | Razzaghi et al. |
| 6,536,523 B1 | 3/2003 | Kresnyak et al. |
| 6,673,249 B2 | 1/2004 | Max |
| 6,730,234 B2 | 5/2004 | Symens |
| 6,762,154 B2 | 7/2004 | Lungwitz et al. |
| 6,984,292 B2 | 1/2006 | Kresnyak et al. |
| 7,311,145 B2 | 12/2007 | Lehman et al. |
| 7,331,389 B2 | 2/2008 | Lehman et al. |
| 7,416,668 B1 | 8/2008 | Theodore |
| 7,429,332 B2 | 9/2008 | Surjaatmadja et al. |
| 7,510,656 B2 | 3/2009 | Shafer et al. |
| 7,622,044 B2 | 11/2009 | Grott |
| 8,158,097 B2 * | 4/2012 | Ditommaso et al. .......... 423/497 |
| 2002/0134550 A1 | 9/2002 | Leeson et al. |
| 2003/0164235 A1 | 9/2003 | Leeson et al. |
| 2003/0168410 A1 | 9/2003 | Robicheaux et al. |
| 2004/0031743 A1 | 2/2004 | Roberts et al. |
| 2004/0112836 A1 | 6/2004 | Manz et al. |
| 2005/0098504 A1 | 5/2005 | Manz et al. |
| 2007/0051513 A1 | 3/2007 | Heins |
| 2007/0056913 A1 | 3/2007 | Burt |
| 2007/0102359 A1 | 5/2007 | Lombardi et al. |
| 2008/0073200 A1 | 3/2008 | Godshall et al. |
| 2008/0156709 A1 | 7/2008 | Johnson |
| 2008/0237141 A1 | 10/2008 | Kerfoot |
| 2008/0277318 A1 | 11/2008 | Bozak et al. |
| 2009/0050572 A1 | 2/2009 | McGuire et al. |
| 2009/0082906 A1 | 3/2009 | Sanderson et al. |
| 2009/0101572 A1 | 4/2009 | Sullivan et al. |
| 2009/0166170 A1 | 7/2009 | Sun |
| 2009/0230059 A1 | 9/2009 | McGuire et al. |
| 2009/0236281 A1 | 9/2009 | Shafer et al. |
| 2010/0320073 A1 * | 12/2010 | Booth .............................. 203/88 |
| 2011/0253634 A1 * | 10/2011 | Soane et al. .................. 210/680 |

* cited by examiner

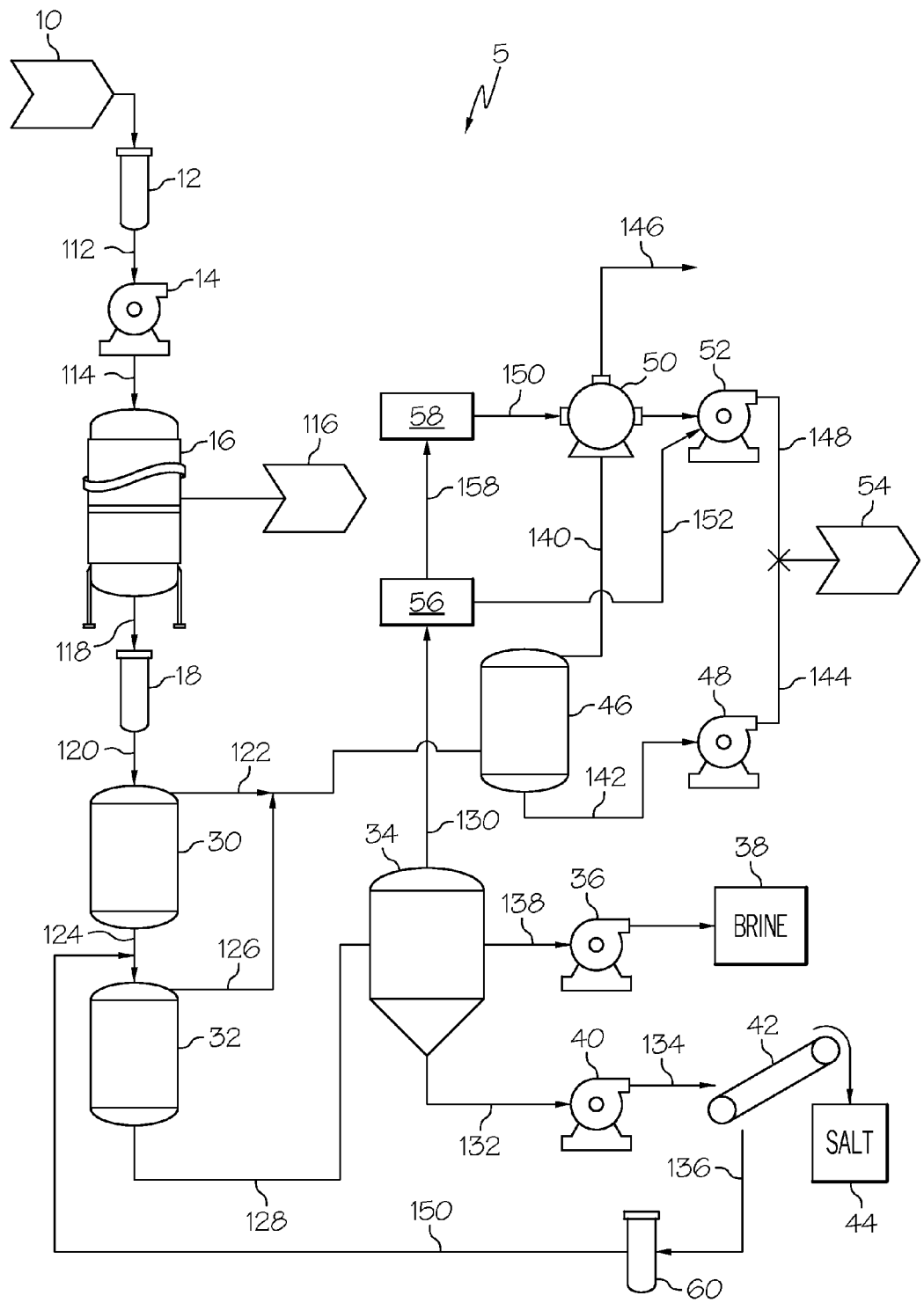

SYSTEMS AND METHOD FOR LOW TEMPERATURE RECOVERY OF FRACTIONATED WATER

CROSS REFERENCE TO RELATED APPLICATIONS

This application claims the benefit of U.S. Provisional Application No. 61/285,669 filed Dec. 11, 2009 which is incorporated herein by reference.

BACKGROUND

Embodiments of the present invention generally relate to methods for the recovery of fractionated water, and specifically relate to methods to recover salt and condensed water from fractionated water under low temperature and pressure conditions.

Hydraulic fracturing is a process applied to drilled oil and gas well holes to improve the ability of fluids (such as oil and gas) to flow from the petroleum bearing formation to the drill hole. It involves injecting high pressure fracturing fluid into the rock formation with various additives, thereby causing the formation to fracture circumferentially away from the hole. During the fracturing process, the injected fracturing fluid is recovered, while the oil and gas flows from the rock formation into the drill hole and up to the well surface. The fracturing process is often necessary for economical well production.

The fractionation of water results from the hydraulic fracturing process, specifically, the chemical additions that are typically used as part of the fracturing process. In the fracturing process, sand is forced under pressure into the cracks that are pressure induced into the oil or gas underground formation. The sand is carried deep into the cracks of the formation by a viscous gel. The gel is "broken" to allow the release of sand at the sand's point of furthest ingress into the formation crack. Typically, the breaking process is initiated by an enzyme breaker. Upon breaking, the fractionated water is removed from the well, and may be treated with one or more treatment methods.

Many oil and natural gas operations generate significant quantities of fractionated water, in addition to their desired hydrocarbon products. Typically, fractionated water is contaminated with significant concentrations of chemicals that require treatment before the water may be reused or discharged to the environment. Fractionated water may contain natural contaminants that are mixed with the water as a result of the fracturing process, such as hydrocarbons and inorganic salts. It may also contain synthetic contaminants, such as spent fracturing fluids including polymers and inorganic cross linking agents, polymer breaking agents, friction reduction chemicals, and lubricants. These synthetic contaminants, which are utilized in the drilling process, remain in the fractionated water upon extraction to the surface Some methods used to recover and process fractionated water utilize a series of evaporators, each one having a higher temperature than the preceding one. Such methods consume tremendous amounts of energy and require specialized boiler plant operators.

Accordingly, there remains a need for a recovery unit for fractionated water that is energy efficient, and cost effective.

SUMMARY OF INVENTION

These and additional objects and advantages provided by the embodiments of the present invention will be more fully understood in view of the following detailed description, in conjunction with the drawings.

In accordance with one embodiment, a method for treating fractionated water produced by a hydraulic fracturing process is provided. The method includes decanting a fractionated water stream in at least one decanter. The decanter is maintained at a temperature ranging from about 90° F. to about 120° F. The method also includes flashing the decanted water in at least one first flash tank and at least one second flash tank in fluid communication with one another to provide a residual concentrate stream. The first flash tank is operated at a temperature ranging from about 180° F. to about 200° F. and the second flash tank is operated at a temperature ranging from about 140° F. to about 160° F. Both the first flash tank and the second flash tank are maintained at a vacuum pressure. The method also includes evaporating the residual concentrate stream in at least one evaporator kettle to produce a concentrated brine. The evaporator kettle is fluidly connected to the second flash tank, and the evaporator kettle is operated at a temperature ranging from about 95° F. to about 115° F. The evaporator kettle is maintained at a vacuum pressure. The method also includes dewatering the concentrated brine to produce recovered salt having less than about 20 wt. % water.

In accordance with yet another embodiment, a method for treating fractionated water produced by a hydraulic fracturing process is provided. The method includes decanting a fractionated water stream at a temperature ranging from about 90° F. to about 120° F. The method also includes flashing the decanted water in at least one first flash tank and at least one second flash tank in fluid communication with one another to provide a residual concentrate stream. The first flash tank is operated at a temperature ranging from about 180° F. to about 200° F. and the second flash tank is operated at a temperature ranging from about 140° F. to about 160° F. The first flash tank is maintained at a vacuum pressure ranging from about 4 psi to about 6 psi, and the second flash tank is maintained at a vacuum pressure ranging from about 10 psi to about 12 psi. The method also includes evaporating the residual concentrate stream in at least one evaporator kettle to produce a concentrated brine. The evaporator kettle is fluidly connected to the second flash tank, and the evaporator kettle produces a kettle vapor stream. The evaporator kettle is operated at a temperature ranging from about 95° F. to about 115° F., and the evaporator kettle is maintained at a vacuum pressure ranging from about 12 psi to about 15 psi. The method also includes condensing the kettle vapor stream in at least one condenser to provide a condenser output, and dewatering the concentrated brine to produce recovered salt having less than about 20 wt. % water. The recovered salt includes from about 10 wt. % to about 30 wt. % calcium salts, from about 50 wt. % to about 90 wt. % sodium chloride, and about 0.01 wt. % to about 2 wt. % salts and other contaminants besides sodium chloride and calcium salts.

In accordance with yet another embodiment, a recovery unit for treating fractionated water is provided. The recovery unit includes a least one decanter operated at a temperature ranging from about 90° F. to about 120° F., a first flash tank and a second flash tank in fluid communication with one another. The first flash tank is in fluid communication with the decanter, the first flash tank is operated at a temperature ranging from about 180° F. to about 200° F., and the second flash tank is operated at a temperature ranging from about 140° F. to about 160° F. The recovery unit also includes at least one evaporator kettle in fluid communication with the second flash tank. The evaporator kettle is operated at a temperature ranging from about 95° F. to about 115° F., and produces a kettle vapor stream. The recovery unit also includes at least one condenser in fluid communication with the evaporator kettle, and a dewatering conveyor in fluid communication with the evaporator kettle to produce recovered salt having less than about 20 wt. % water.

BRIEF DESCRIPTION OF THE DRAWINGS

The following detailed description of the embodiments of the present invention can be best understood when read in conjunction with the following drawings, where like structure is indicated with like reference numerals, and in which:

FIG. 1 shows a flow diagram illustrating a system for the treatment of fractionated water according to one or more embodiments of the present disclosure.

The embodiments set forth in the drawings are illustrative in nature and not intended to be limiting of the invention defined by the claims. Moreover, individual features of the drawings and invention will be more fully apparent and understood in view of the detailed description.

Skilled artisans appreciate that elements in the figures are illustrated for simplicity and clarity and have not necessarily been drawn to scale. For example, the dimensions of some of the elements in the figures may be exaggerated relative to other elements, as well as conventional parts removed, to help to improve understanding of the various embodiments of the present invention.

DETAILED DESCRIPTION

In one embodiment, referring to FIG. 1, a flow diagram of a system for treating fractionated water produced by a hydraulic fracturing process is provided. The method includes decanting a fractionated water stream 10. The decanter 16 is maintained at a temperature ranging from about 90° F. to about 120° F. The method also includes flashing the decanted water 118 in a first flash tank 30 and a second flash tank 32 which are in fluid communication with one another in order to provide a residual concentrate stream 128. The first flash tank 30 may be operated at a temperature ranging from about 180° F. to about 200° F. The second flash tank 32 may be operated at a temperature ranging from about 140° F. to about 160° F. Both the first flash tank 30 and the second flash tank 32 are maintained at a vacuum pressure.

The method also includes evaporating the residual concentrate stream 128 in at least one evaporator kettle 34 to produce a concentrated brine 132. The evaporator kettle 34 is fluidly connected to the second flash tank 32. The evaporator kettle 34 is operated at a temperature ranging from about 95° F. to about 115° F., and is maintained at a vacuum pressure. The method also includes dewatering the concentrated brine 132 to produce recovered salt 44 having less than about 20 wt. % water.

The fractionated water stream 10 results from hydraulic fracturing of oil-gas wells. The fractionated water stream 10 may comprise various concentrations of dissolved solutes. In one or more embodiments, the fractionated water stream 10 comprises a solute concentration ranging from about 100,000 to about 300,000 ppm, or from about 150,000 to about 200,000 ppm. The fractionated water stream 10 may contain a wide variety of components, including but not limited to, sodium chloride, calcium salts, surfactants, hydrocarbons, rock, shale, other salts and other contaminants.

In one embodiment, the recovery unit 5 comprises at least one strainer 12. The strainer 12 removes solids, such as iron, rock, sand, and oil from the fractionated water stream 10 to produce strained water 112. These solid materials may interrupt and damage the proper functioning of the recovery unit 5, and should be removed before entering the decanter 16. In one possible configuration, the strainer 12 is configured to remove particles larger than 1 micron in size. Alternatively, it is also contemplated that the strainer 12 may be used to remove particles larger than 1, 3, 5, or 10 microns in size, depending on the composition of the fractionated water stream 10. After straining, the strained water 112 may be pumped by at least one feed pump 14 to a decanter 16 for further processing.

The feed pump 14 may typically have a capacity ranging from about 20 to about 200 gallons per minute (gpm). Alternatively, it is also contemplated that the feed pump 14 may have other capacities to suit the demands of the method and system disclosed herein. Furthermore, although only one feed pump 14 is shown, any number of pumps may be used, depending on the amount of fractionated water to be processed.

Because the feed water 114 may contain surfactants and hydrocarbons that would ultimately contaminate the recovery unit 5, the surfactants and hydrocarbons must be removed from the feed water 114 before additional processing and evaporation can be conducted. These contaminants may include, but are not limited to, guar, weak acids, polymers, and various hydrocarbons. Thus, the decanter 16 is configured to isolate these contaminants, and output a recovered-oil surfactant stream 116 out of the recovery unit 5.

The decanter 16 heats the feed water 114 to a temperature where the surfactants, hydrocarbons, and other contaminants are separated from the remainder of the fractionated water. The recovered oil-surfactants 116 may be aggregated and collected in at least one holding tank for later processing or recycling operations. The decanted water 118, now substantially free from hydrocarbon and surfactant contaminants, exits the decanter 16, and may be pumped to at least one filter 18.

The temperature necessary to remove the recovered oil-surfactants 116 from the rest of the water may vary based on the composition of the feed water 114. The decanter 16 is usually operated at a temperature ranging from about 90° F. to about 120° F. The decanter 16 may also be operated at a temperature ranging from about 100° F. to about 110° F., or from about 80° F. to about 130° F. However, it is also contemplated that the decanter 16 may be operated at other temperatures, dependent on the composition of the feed water 114.

After removal of the hydrocarbons and surfactants by the decanter 16, the total dissolved solute levels of the decanted water 118 may range from about 200,000 ppm to about 250,000 ppm, or from about 225,000 to about 235,000 ppm. However, other solute concentrations are also contemplated.

The recovery unit 5 may comprise at least one filter 18. The filter 18 removes any remaining solids and hydrocarbon droplets still remaining after processing by the strainer 12 and the decanter 16. The filtrate 120 produced by the at least one filter 18 may be pumped to the first flash tank 30 to begin the flashing step.

The filter 18 may be a bag type filter, a screen filter, and other filter types as will be appreciated by one of ordinary skill. The recovery unit 5 may include any number of filters 18 necessary to conduct the filtration operation depending on the flow levels of the fractionated water stream 10. In one configuration, the recovery unit 5 comprises two filters. Alternatively, the recovery unit may comprise anywhere from 1 filter to 10 filters. The filter 18 may have an effective filtration dimension operable to filter out any remaining solids and hydrocarbon droplets. Alternatively, the filter 18 may comprise a series of filters, cascading in filter size, where the first filter has a larger dimension, cascading down to a second filter having a smaller filter dimension, and a third filter having an even smaller filter dimension.

The recovery unit 5 may comprise at least one flash tank (30, 32). The flash tank (30, 32) may function to flash off vapor from the filtrate 120, thereby concentrating the solution through vaporization of a portion of the remaining water present in the filtrate 120. The vapor produced by the flash tank (30, 32) typically comprises pure water, as well as some non-condensable gases. In one configuration, the recovery unit 5 comprises a first flash tank 30 and a second flash tank 32. Alternatively, the recovery unit 5 may include one, two, three, four, or five flash tanks provided in series or in parallel.

In one embodiment, the filtrate 120 is pumped into the first flash tank 30, and a first vapor stream 122 is flashed off, while a first concentrate stream 124 is pumped out to a second flash tank 32 for further processing. The first vapor stream 122 may be transferred to a condensate pot 46 for further processing as will be described in further detail below.

The first flash tank 30 may be operated at a vacuum pressure. The first flash tank 30 may be operated at a vacuum pressure ranging from about 3 psi to about 7 psi, or from about 4 psi to about 6 psi, or about 5 psi. The first flash tank 30 may be operated at a temperature ranging from about 175° F. to about 205° F., or from about 180° F. to about 200° F., or from about 185° F. to about 195° F. The lower temperatures are feasible for flashing due to the lower pressures provided in the tank. However, it is also contemplated that the first flash tank 30 may be operated at other temperatures suitable to flash additional water from the solution.

The first flash tank 30 may be controlled using a sensor configured to monitor the level of the solution in the tank, and a controller programmed to adjust the temperature to achieve the desired concentration level. The first flash tank 30 may include a hinge valve that operates to allow steam to exit the vessel when a given temperature/pressure is reached. The first flash tank 30 may also include a level control suitable to maintain a predetermined level of solution.

As shown in FIG. 1, the second flash tank 32 may receive the first concentrate stream from the first flash tank 30. The second flash tank 32 may have a similar design as the first flash tank 30, and function to further heat the first concentrate stream 124 and flash additional water from the solution.

Similar to the first flash tank 30, the second flash tank 32 may be operated at a range of temperatures suitable to produce the desired composition of the residual concentrate stream 128. However, the second flash tank 32 may be maintained at an even lower pressure than the first flash tank 30, thus, it may be operated at a lower temperature than the first flash tank 30. The second flash tank 32 may be operated at a vacuum pressure ranging from about 9 psi to about 14 psi, or from about 10 psi to about 12 psi, or about 11 psi. The second flash tank 32 may be operated a temperature ranging from about 130° F. to about 170° F., or from about 140° F. to about 160° F., or from about 145° F. to about 155° F. However, it is also contemplated that the second flash tank 32 may be operated at other temperatures.

The residual concentrate stream 128 that is transferred to the evaporator kettle 34 for additional evaporation. The evaporator kettle 34 functions to evaporate additional water from the solution. The evaporator kettle 34 may be operated in a variety of modes described below, where each mode is configured to produce different compositions of a brine/salt mixture depending on the needs of the user.

The evaporator kettle 34 is operated at a temperature sufficient to evaporate additional water. The evaporator kettle 34 is maintained at a vacuum, thus allowing the evaporation step to be conducted at a temperature much lower than typically necessary under non-vacuum conditions. The evaporator kettle 34 may be operated at a vacuum pressure ranging from about 10 psi to about 17 psi, or from about 12 psi to about 15 psi, or about 13 psi to about 14 psi. The evaporator kettle 34 is operated at a temperature ranging from about 85° F. to about 125° F., or from about 95° F. to about 115° F., or from about 100° F. to about 110° F.

In one embodiment, the recovery unit 5 includes a condensate pot 46. The condensate pot 46 collects and aggregates the vapor streams produced by the various evaporation and flash tanks. For example, the condensate pot 46 may collect the first vapor stream 122, and the second vapor stream 126 from the first flash tank 30 and the second flash tank 32 respectively. The condensate pot 46 allows the condensate from the vapor streams mentioned above to collect in a common vessel. The condensate pot 46 outputs both a non-condensable gas line 140, and a condensate liquid 142. The condensate pot 46 may also be in fluid communication with a vacuum pump 50 via the non-condensable gas line 140. The recovery unit 5 may also include a condensate pot pump 48, to pump the condensate liquid 142 to the condensate outlet 54 via a pumped condensate pot line 144. A condensate pot pump 48 pumps the condensate liquid 142 from the condensate pot 46 to the condensate outlet 54.

The primary source of vacuum is generated throughout the recovery unit by condensing the kettle vapor stream 130 in a condenser 56. The condenser 56 produces a liquid water stream, the condenser output 152. By condensing the steam, a vacuum is created within the entire recovery unit 5, thus lowering the operating pressure of the first flash tank 30, the second flash tank 32, and the evaporator kettle 34. Because a vacuum is present in each of the aforementioned vessels, they may achieve evaporation and flashing at relatively low temperatures, thus saving enormous amounts of energy. The condenser 56 may be fluidly connected gas separation chamber 58 via a condenser gas line 158, in order to remove the non-condensable gases from the condenser 56.

In one configuration, the condenser 56 comprise a fin tube fan cooled type condenser powered by an electrical 60 horsepower fan Alternatively, the condenser 56 may be chilled using cold water, streaming air, or other cooling methodology, as will be appreciated by one of ordinary skill. As mentioned above, the condenser 56 may also be fluidly connected to a gas separation chamber 58 for further separation of the liquid phase from the gaseous phase. The accumulate non-condensable gases that accumulate in the condenser 56 are transferred to the gas separation chamber 58.

The gas separation chamber 58 is connected to a vacuum pump 50 and a condenser pump 52. The condenser pump 52 may be configured to pump the condensate stream 152 along with the liquid contents of the gas separation chamber as a pumped condenser line 148 and combine it with the condensate outlet 54. The non-condensable gases present in the chamber 58 are removed with a vacuum pump 50 via a gas escape line 150, and emitted from the recovery unit 5 as a non-condensable gas stream 146. The liquid present in the gas separation chamber 58 may removed by the condenser pump 52, and is removed from the system as condensate 54. The vacuum pump 50 allows the recovery unit 5 to maintain the vacuum pressures described above and keep the non-condensable gases from building up in the recovery unit 5.

The vacuum pump 50 may provide various amounts of vacuum pressure to the gas separation chamber 58. In one configuration, the vacuum pump 50 may provide a vacuum pressure within the gas separation chamber 58 ranging from about 0.5 psi to about 1 psi, or from about 0.5 psi to about 3 psi. The vacuum pump 50 operates to remove the non-condensable materials from the gas separation chamber 58. Because the non-condensable materials may not condensed under conditions that will condense the other vapor streams (mainly steam), they must be continually removed from the system to ensure smooth, uninterrupted system operation. The vacuum pump 50 outputs a vacuum outlet 146. The vacuum outlet 146 comprises non-condensable gases, such as carbon dioxide. These gases are removed from the various vessels and released into the atmosphere. The condensable gases may comprise from 0 wt. % to 2 wt. % of the fractionated water stream 10, or from about 0.5 wt. % to about 1 wt. %.

In a brine production mode, the evaporator kettle 34 is operated to produce a brine stream 138, which is pumped out by the brine pump 36 as a brine outlet 38. The brine pump 36 may draw out the brine stream 138 before the saturation point of the solution is met, and thus, minimal amounts of solids are precipitated out of the solution. The brine outlet 38 may have a total dissolved solids level ranging from about 230,000 to about 300,000 ppm, or from about 250,000 to about 280,000 ppm. However, it is also contemplated that the brine outlet 38 may comprise other concentrations of total dissolved solutes. The brine outlet 38 may be pumped to a holding tank, and may be subsequently reused in an oil-gas well hydraulic fracturing process. Alternatively, the brine outlet 38 may be used for other commercial and industrial uses.

In a salt concentrate mode, the evaporator kettle 34 may be operated until salt precipitates to the bottom of the evaporator kettle 34 and is removed by the salt concentrate pump 40 as a concentrated brine 132 which contains precipitated salt and small amounts of brine. The concentrated brine 132 may comprise a composition ranging from about 60 wt. % to about 80 wt. % water. Alternatively, the concentrated brine 132 may comprise a composition ranging from about 65 wt. % to about 75 wt. % water. However, it is also contemplated that the concentrated brine 132 may comprise other mixtures for use in the process disclosed herein.

A dewatering conveyor 42 may receive the concentrated brine 132 from the salt concentrate pump 40, and dewater the concentrated brine 132 to produce recovered salt 44 and a residual water stream 136. The dewatering conveyor 42 may comprise a device operable to compress the pumped salt stream 134 and drain any water from the solid composition to produce a recovered salt 44. In addition, the dewatering conveyor 42 allows the residual heat of the pumped salt stream 134 to provide sufficient heat to evaporate remaining moisture present on the solid salt product. In one embodiment, the dewatering conveyor 42 may be similar to the unit produced by Meyer Industries. However, other types and configurations of dewatering conveyors 42 are also contemplated for use within the methods and apparatuses disclosed herein. The recovered salt 44 may be transferred to large storage containers for shipping, or immediate use. The residual water stream 136 that is released by the dewatering conveyor 42 is pumped to at least one circulation filter 60 for additional processing and recycling.

The recovered salt 44 may have varying compositions, depending on the composition of the fractionated water stream 10. The recovered salt 44 may include calcium salts, sodium chloride, and other salts and contaminants. In one configuration, the recovered salt 44 may comprise from about 10 wt. % to about 30 wt. % calcium salts, or from about 50 wt. % to about 90 wt. % sodium chloride, or from about 0.01 wt. % to about 3 wt. % other salts and contaminants. In another configuration, the recovered salt 44 may comprise a solid salt product having less than 2% other salts and contaminants, or from about 0.01 wt. % to about 1 wt. % other salts and contaminants. The recovered salt 44 may have less than about 20 wt. % water, or less than about 15 wt. % water, or less than about 10 wt. % water, or less than about 5 wt. % water.

The condensate outlet 54 may comprise a relatively pure water stream that is suitable for drinking. The condensate outlet 54 may aggregate the condensed water streams produced by the recovery unit 5. The condensate outlet 54 may comprise a total dissolved solutes level ranging from less than 2000 ppm, less than about 1500 ppm, less than about 1000 ppm, or less than about 500 ppm, or from about 50 ppm to about 225 ppm. The condensate outlet 54 may feed into a storage tank or may be recycled to various stages of the process. In one configuration, the condensate outlet 54 may be recycled for further oil-gas well fractionation.

Referring to another embodiment as shown in FIG. 1, at least one circulation filter 60 receives the residual brine stream 136 from the dewatering conveyor 42. The circulation filter 60 removes the particulate matter from the residual brine stream 136, and re-circulates the solution to the second flash tank 32 for reprocessing. In one configuration, the circulation filter 60 is a bag filter. However, other types of filtering devices may also be used in conjunction with the process. It is contemplated that the circulation filter 60 may have an effective filtration dimension operable to filter out any remaining solids, and hydrocarbon droplets. In another configuration, it is contemplated that the circulation filter 60 comprises an alternative type of filter device suitable for use in combination with the device and process described herein to remove any remaining solids and hydrocarbon droplets.

Entrainment separators may be used in conjunction with the first flash tank 30, the second flash tank 32, and the evaporator kettle 34 as will be appreciated by one having ordinary skill. The entrainment separators may comprise devices suitable to prevent a liquid component from escaping a vessel aside the vapor component. In one configuration, the entrainment separators may be a centrifugal force entrainment separator. The entrainment separators allow vapor to pass through, while channeling the liquid component back into the main vessel. Therefore, when water is vaporized in the aforementioned vessels, it pass through the entrainment separators. Any liquid water is blocked from passage, and is transferred back to the vessel for additional evaporation.

Most fractionated water recovery systems utilize vapor recompression systems to provide heat to the recovery unit. In contrast, the present disclosure utilizes a hot oil system to heat the decanter 16, the first flash tank 30, the second flash tank 32, and the evaporator kettle 34 along with the various heat exchangers and preheaters found in the process. In one configuration, the recovery unit is heated without using vapor recompression. Because no vapor recompression is used in conjunction with the recovery unit 5, no boiler plant is necessary. Therefore, the requisite certifications, inspections, and safety measures that are associated with the boiler plant can be avoided. Accordingly, it is contemplated that all of the flashing and evaporating operations in the recovery unit 5 are operated at a temperature lower than 212° F., or lower than 200° F., or lower than 195° F. In another configuration, the recovery unit 5 includes no steam at a temperature higher than about 212° F.

A hot oil system may be used to supply heat to the various unit operations of the recovery unit. The hot oil system may comprise a network of pipelines configured to transport hot, and cooled oil around to the unit operations of the recovery unit. The hot oil system may include heat outlets provided at the decanter 16, the first flash tank 30, the second flash tank 32, the evaporator kettle 34, and through a plurality of heat exchangers located through the recovery unit 5 as will be described below.

As mentioned above, the fractionated water stream 10 often contains various chlorides and salts. As vaporization takes place in the flash tanks 30, 32 and the evaporator kettle 34, the chlorides become more and more concentrated. This high concentration of chlorides results in an extremely corrosive environment. The corrosive environment may damage the various vessels, piping, and unit operations. Accordingly, the recovery unit 5 described herein features only minimal metallic parts. Particularly, in one configuration, the recovery unit 5 only has one metallic feature; the various heat exchangers and preheaters may comprise titanium components. Therefore, the entire unit comprises corrosion resistant contact surfaces. By contact surfaces, it is understood to mean the surfaces of the recovery unit 5, that contact the liquid or gaseous components of the fractionated water stream 10.

The first flash tank 30, the second flash tank 32, and the evaporator kettle 34 may each comprise non-metallic contact surfaces. In one configuration, the non-metallic contact surfaces comprise a polymer lining. It is contemplated that the polymer lining may degrade a temperatures higher than about 212° F. The polymer lining may comprise a Belzona lining. Because the first flash tank 30, the second flash tank 32, and the evaporator kettle 34 are each maintained at a temperature less than 200° F., the Belzona lining will not be damaged by excessive heat. The Belzona lining is corrosion resistant, and protects the related vessel. Other non-metallic, corrosion-resistant contact surfaces are also contemplated.

The recovery unit 5 may comprise a piping system comprising corrosion resistant contact surfaces. In one embodiment, the corrosion resistant contact surfaces comprise non-metallic contact surfaces. In one configuration, the non-metallic contact surfaces comprise Teflon coated contact surfaces. However, other non-metallic contact surfaces are also contemplated.

The hot oil system may be operated at a range of different fluid capacities, ranging from about 100 to about 1000 gallons per minute. However, it is also contemplated that the hot oil system may have other capacities necessary to fulfill the heating requirements of the recovery unit. In one or more embodiments, the hot oil system may be operated at a temperature ranging from about 200° F. to about 400° F., or from about 250° F. to about 350° F. However, it is also contemplated that the hot oil system can be operated at other temperatures.

In one embodiment, the hot oil system may be similar to the commercial systems manufactured by Gaumer. Alternatively, the unit operations of the process may be heated with gasoline, in-field petroleum, or propane. Furthermore, it is also contemplated that the hot oil system may be interchangeable with other conventional heating systems that will be appreciated by one of ordinary skill.

The recovery unit described herein may developed with an extensive energy optimization system. In one embodiment, the residual heat present in the different output streams of the decanter 16, first flash tank 30, second flash tank 32, and evaporator kettle 34 may be arranged in conjunction with a plurality of heat exchangers to ensure that no salvageable heat energy is squandered. For example, in one configuration, the steam from the first flash tank 30 may be used to preheat the first concentrate stream 124 before entry into the second flash tank 32. The steam/vapor outputs of the various vessels may be in heat communication with the input streams to downstream or upstream vessels, to ensure that any residual heat may be utilized by the process.

The recovery unit may make extensive use of preheaters to maximize the efficiency of the evaporation vessels, such as the decanter 16, first flash tank 30, the second flash tank 32, and the evaporator kettle 34. The preheaters are arranged to heat the feed streams that enter the aforementioned vessels, including the feed water 114, the filtrate 120, the first concentrate stream 124 and the residual concentrate stream 128. The preheaters may be heated with a circulating hot oil stream provided by the hot oil system described above, or may be heated with residual heat provided through heat exchange with condensate streams or steam which is produced by the various evaporation units described herein.

A programmable logic controller system (PLC) may be used to control, monitor, and record the operation of the recovery unit. The PLC controls the recovery unit through monitoring of the temperature, pressure, flow rates, conductivity, densities and other characteristics of the unit operations inlets and outlets, as well be appreciated by one of ordinary skill.

In yet another embodiment, a portable recovery unit is provided. The portable recovery unit may comprise a moveable vehicle comprising a support surface. The apparatus discussed throughout the above disclosure may be configured to be mounted on the support surface. The portable recovery unit is sized to fit on a road trailer and comply with regulatory weight limits. Alternatively, the portable recovery unit can be disposed on any portable surface, such as a moveable platform, truck, or trailer. Also, the portable recovery unit weighs less than the maximum weight limits tolerated by public roads, and may be transported on a road trailer or vehicle. For example, the portable recovery unit described herein may weigh between 40000 lbs and 93000 lbs.

Various sizes are also contemplated for the portable recovery unit. For example, the portable recovery unit may be sized to fit easily on mountain side mining sites. Moreover, the portable recovery unit may be sized to treat between about 100 barrels per day and about 5000 barrels per day or from about 200 to about 3000 barrels per day. In addition, it is also contemplated that the various capacities of the unit operations disclosed herein may be adjusted to achieve a desired production capacity.

It is further noted that terms like "preferably," "generally," "commonly," "desirably", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is additionally noted that the terms "substantially" and "about" are utilized herein to represent the inherent degree of uncertainty that may be attributed to any quantitative comparison, value, measurement, or other representation. The terms "substantially" and "about" are utilized herein to represent the degree by which a quantitative representation may vary from a stated reference without resulting in a change in the basic function of the subject matter at issue.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

I claim:

1. A method for treating fractionated water produced by a hydraulic fracturing process, the method comprising:
   decanting a fractionated water stream in at least one decanter, wherein the decanter is maintained at a temperature ranging from about 90° F. to about 120° F.;
   flashing the decanted water in at least one first flash tank and at least one second flash tank in fluid communication with one another to provide a residual concentrate stream, wherein the first flash tank is operated at a temperature ranging from about 180° F. to about 200° F., wherein the second flash tank is operated at a temperature ranging from about 140° F. to about 160° F., and wherein the first flash tank and the second flash tank are maintained at a vacuum pressure;
   evaporating the residual concentrate stream in at least one evaporator kettle to produce a concentrated brine, wherein the evaporator kettle is fluidly connected to the second flash tank, wherein the evaporator kettle is operated at a temperature ranging from about 95° F. to about 115° F., and wherein the evaporator kettle is maintained at a vacuum pressure;
   dewatering the concentrated brine to produce recovered salt having less about 20 wt. % water; and
   the recovered salt comprises from about 10 wt. % to about 30 wt. % calcium salts, from about 50 wt. % to about 90 wt. % sodium chlorida, and from about 0.01 wt. % to about 2 wt. % salts and other contaminants besides sodium chloride and calcium salts.

2. The method of claim 1, wherein the first flash tank is maintained at a vacuum pressure ranging from about 4 psi to about 6 psi, and wherein the second flash tank is maintained at a vacuum pressure ranging from about 10 psi to about 12 psi.

3. The method of claim 1, wherein the evaporator kettle is maintained at a vacuum pressure ranging from about 12 psi to about 15 psi.

4. The method of claim 1, further comprising removing non-condensable gases from the evaporator kettle with at least one vacuum pump, wherein the vacuum pump is in fluid communication with the evaporator kettle.

5. A method for treating fractionated water produced by a hydraulic fracturing process, the method comprising:
   decanting a fractionated water stream in at least one decanter, wherein the decanter is maintained at a temperature ranging from about 90° F. to about 120° F.;
   flashing the decanted water in at least one first flash tank and at least one second flash tank in fluid communication with one another to provide a residual concentrate stream, wherein the first flash tank is operated at a temperature ranging from about 180° F. to about 200° F., wherein the second flash tank is operated at a temperature ranging from about 140° F. to about 160° F., and wherein the first flash tank and the second flash tank are maintained at a vacuum pressure;
   evaporating the residual concentrate stream in at least one evaporator kettle to produce a concentrated brine, wherein the evaporator kettle is fluidly connected to the second flash tank, wherein the evaporator kettle is operated at a temperature ranging from about 95° F. to about 115° F., and wherein the evaporator kettle is maintained at a vacuum pressure, and wherein the evaporator kettle produces a kettle vapor stream, and wherein the method further comprises condensing the kettle vapor stream in at least one condenser to provide a condenser output, and wherein the condenser output has a concentration of total dissolved solute level ranging from about 50 ppm to about 225 ppm; and
   dewatering the concentrated brine to produce recovered salt having less about 20 wt. % water.

6. The method of claim 5, wherein condensing the kettle vapor stream creates vacuum pressure in the first flash tank, the second flash tank, and the evaporator kettle.

7. The method of claim 1, further comprising straining the fractionated water stream with at least one strainer, wherein the at least one strainer is in fluid communication with the decanter.

8. The method of claim 1, further comprising filtering the decanted water to remove any remaining solids and hydrocarbon droplets with at least one filter, wherein the at least one filter is in fluid communication with the decanter.

9. The method of claim 1, wherein the first flash tank, the second flash tank, and the evaporator kettle comprise only non-metallic contact surfaces.

10. The method of claim 9, wherein the non-metallic contact surfaces comprise a polymeric coating.

11. The method of claim 1, wherein the decanter, the first flash tank, the second flash tank, and the evaporator kettle are connected with a piping system, wherein the piping system comprises only non-metallic contact surfaces.

12. The method of claim 1, wherein the decanter, the first flash tank, the second flash tank, and the evaporator kettle are heated using a hot oil system.

13. A method for treating fractionated water produced by a hydraulic fracturing process, the method comprising:
   decanting a fractionated water stream at a temperature ranging from about 90° F. to about 120° F.;
   flashing the decanted water in at least one first flash tank and at least one second flash tank in fluid communication with one another to provide a residual concentrate stream, wherein:
      the first flash tank is operated at a temperature ranging from about 180° F. to about 200° F.,
      the second flash tank is operated at a temperature ranging from about 140° F. to about 160° F.,
      the first flash tank is maintained at a vacuum pressure ranging from about 4 psi to about 6 psi, and
      the second flash tank is maintained at a vacuum pressure ranging from about 10 psi to about 12 psi;
   evaporating the residual concentrate stream in at least one evaporator kettle to produce a concentrated brine, wherein:
      the evaporator kettle is fluidly connected to the second flash tank,
      the evaporator kettle produces a kettle vapor stream,
      the evaporator kettle is operated at a temperature ranging from about 95° F. to about 115° F., and
      the evaporator kettle is maintained at a vacuum pressure ranging from about 12 psi to about 15 psi;
   condensing the kettle vapor stream in at least one condenser to provide a condenser output;
   dewatering the concentrated brine to produce recovered salt having less than about 20 wt. % water, wherein the recovered salt comprises from about 10 wt. % to about 30 wt. % calcium salts, and from about 50 wt. % to about 90 wt. % sodium chloride, and from about 0.01 wt. % to about 2 wt. % salts and other contaminants besides sodium chloride and calcium salts; and
   wherein the condensate stream has a concentration of total dissolved solutes ranging from about 50 ppm to about 225 ppm.

14. The method of claim 13, wherein the first flash tank, the second flash tank, and the evaporator kettle comprise only non-metallic contact surfaces.

15. The method of claim 14, wherein the non-metallic contact surfaces comprise a polymeric coating.

* * * * *